US010928946B2

United States Patent
Ong et al.

(10) Patent No.: US 10,928,946 B2
(45) Date of Patent: Feb. 23, 2021

(54) TOUCHSCREEN STYLUS AND DISPLAY MODULE INTERFACE

(71) Applicant: Dell Products L.P., Round Rock, TX (US)

(72) Inventors: Aik Keong Ong, Singapore (SG); Hsu Feng Lee, Taipei (TW); Wei Wei Wilson Chua, Singapore (SG)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/277,717

(22) Filed: Feb. 15, 2019

(65) Prior Publication Data

US 2020/0264724 A1 Aug. 20, 2020

(51) Int. Cl.
*G06F 3/041* (2006.01)
*G06F 3/044* (2006.01)
*G06F 3/0354* (2013.01)

(52) U.S. Cl.
CPC ........ *G06F 3/0414* (2013.01); *G06F 3/03545* (2013.01); *G06F 3/044* (2013.01); *G06F 3/0412* (2013.01)

(58) Field of Classification Search
CPC ...... G06F 3/033; G06F 3/0334; G06F 3/0338; G06F 3/046; G06F 3/03545; G06F 2003/04105; G06F 3/0414; G06F 3/044; G06F 3/0412
See application file for complete search history.

(56) References Cited

U.S. PATENT DOCUMENTS

| | | | | |
|---|---|---|---|---|
| 4,725,978 A * | 2/1988 | Fujioka | ............... | G06F 3/03545 345/173 |
| 5,138,118 A * | 8/1992 | Russell | ................... | G06F 3/046 178/19.03 |
| 6,738,050 B2 * | 5/2004 | Comiskey | .............. | B41J 3/4076 345/107 |
| 7,064,750 B2 * | 6/2006 | Duret | .................... | G06F 3/0346 345/173 |
| 9,213,424 B1 * | 12/2015 | Dunn | .................... | G06F 3/0416 |
| 9,612,671 B1 * | 4/2017 | Blaszczak | .............. | G06F 3/039 |
| 9,874,966 B2 * | 1/2018 | Ribeiro | .................... | G06F 3/038 |
| 10,162,435 B2 * | 12/2018 | Clark | ....................... | G06F 3/017 |
| 10,331,235 B2 * | 6/2019 | Fleck | .................... | G06F 3/0346 |
| 2002/0148655 A1 * | 10/2002 | Cho | .................... | G06F 3/03542 178/18.09 |
| 2003/0112220 A1 * | 6/2003 | Yang | ................... | G06F 3/03545 345/156 |
| 2003/0142073 A1 * | 7/2003 | Fukushima | ........... | G06F 3/0346 345/158 |
| 2003/0151596 A1 * | 8/2003 | Moyne | ................ | G06F 3/03545 345/173 |

(Continued)

*Primary Examiner* — William Lu
(74) *Attorney, Agent, or Firm* — Baker Botts L.L.P.

(57) ABSTRACT

A touchscreen stylus, including a tip, including: a force sensing module to identify an analog force signal of the touchscreen stylus with respect to a touchscreen; a tilt sensing module to identify an analog tilt signal of the touchscreen stylus with respect to the touchscreen; a body, including: a mixer computing module to combine the analog force signal and the analog tilt signal to generate a combined analog signal; an analog-to-digital converter (ADC) to convert the combined analog signal to a combined digital signal; and a communications module to transmit the combined digital signal.

13 Claims, 3 Drawing Sheets

(56) References Cited

U.S. PATENT DOCUMENTS

| | | | |
|---|---|---|---|
| 2004/0169439 A1* | 9/2004 | Toda | B06B 1/0655 310/328 |
| 2004/0260507 A1* | 12/2004 | Chang | G06F 3/0346 702/152 |
| 2005/0128191 A1* | 6/2005 | Katsurahira | G06F 1/3203 345/179 |
| 2006/0279549 A1* | 12/2006 | Zhang | G06F 3/03545 345/173 |
| 2007/0205996 A1* | 9/2007 | Huang | G06F 3/03545 345/179 |
| 2008/0076351 A1* | 3/2008 | Washiro | H04B 5/0031 455/41.1 |
| 2008/0150918 A1* | 6/2008 | Hagen | G06F 3/03545 345/179 |
| 2010/0085325 A1* | 4/2010 | King-Smith | G06F 3/03545 345/174 |
| 2010/0295814 A1* | 11/2010 | Kent | G06F 3/044 345/174 |
| 2010/0321315 A1* | 12/2010 | Oda | G06F 3/044 345/173 |
| 2011/0061948 A1* | 3/2011 | Krah | G06F 3/0418 178/18.01 |
| 2012/0050231 A1* | 3/2012 | Westhues | G06F 3/03545 345/179 |
| 2013/0009907 A1* | 1/2013 | Rosenberg | G06F 3/046 345/174 |
| 2013/0106772 A1* | 5/2013 | Kim | G06F 3/041 345/174 |
| 2013/0120237 A1* | 5/2013 | DiVerdi | G09G 5/00 345/156 |
| 2015/0015489 A1* | 1/2015 | Vaganov | G06F 3/013 345/158 |
| 2015/0070315 A1* | 3/2015 | Oda | G06F 3/0383 345/174 |
| 2015/0123923 A1* | 5/2015 | Stern | G06F 3/03545 345/173 |
| 2015/0212601 A1* | 7/2015 | Zerayohannes | G06F 3/03545 345/179 |
| 2016/0139691 A1* | 5/2016 | Li | G06F 3/03545 345/179 |
| 2016/0188013 A1* | 6/2016 | Yoneoka | G06F 3/03545 345/174 |
| 2017/0068339 A1* | 3/2017 | Zimmerman | G06F 3/0383 |
| 2018/0081456 A1* | 3/2018 | Li | G06F 3/03545 |
| 2018/0299976 A1* | 10/2018 | Chiewcharnpipat | G06F 3/038 |
| 2018/0335870 A1* | 11/2018 | Ali | G06F 3/044 |

* cited by examiner

TOUCHSCREEN STYLUS AND DISPLAY MODULE INTERFACE

BACKGROUND

Field of the Disclosure

The disclosure relates generally to a touchscreen stylus that interfaces with a display module.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems can include touchscreen technology. Current touchscreen-stylus technologies can be propriety including stylus tip design and communication protocols. Each touchscreen stylus can support only its own touchscreen/stylus technology and cannot be used in other touchscreen/stylus technologies. This can provide an inferior user experience when having to change different touchscreen styluses frequency across different systems.

SUMMARY

Innovative aspects of the subject matter described in this specification may be embodied in a system including a touchscreen stylus, including: a tip, including: a force sensing module configured to identify a force signal of the touchscreen stylus with respect to a touchscreen; a tilt sensing module configured to identify a tilt signal of the touchscreen stylus with respect to the touchscreen; a body, including: a communications module configured to transmit touchscreen stylus-based data representing the force signal and the tilt signal; a display module, including: the touchscreen; a position sensing module configured to identify a position signal of the tip of the touchscreen stylus in a x- and a y-plane of the touchscreen; a communications module configured to transmit touch-position based data representing the position signal; a computing apparatus, including: a communications module configured to receive the touchscreen stylus-based data and the touch-position based data; and a processing module configured to perform an inking function based on a combination of the touchscreen stylus-based data and the touch-position based data.

These and other embodiments may each optionally include one or more of the following features. For instance, the tip is a conductive tip, and the touchscreen is a projected capacitive (PCAP) touchscreen. The communications module of the touchscreen stylus includes one of a Wi-Fi communications module and a Bluetooth communications module. The tip is removable from the touchscreen stylus. The tilt sensing module includes an accelerometer. The force sensing module includes an electromagnet (EM) pressure sensing module, or an optical pressure sensing module. The display module is coupled to the computing apparatus. The force signal is an analog force signal, and the tilt signal is an analog tilt signal. The body of the touchscreen stylus further includes a control module to pack and combine the force signal and the tilt signal, and wherein the communications module of the touchscreen stylus is configured to transmit the touchscreen stylus-based data representing the combined digital signal to the computing apparatus.

Innovative aspects of the subject matter described in this specification may be embodied in a touchscreen stylus, including a tip, including: a force sensing module to identify a force signal of the touchscreen stylus with respect to a touchscreen; a tilt sensing module to identify a tilt signal of the touchscreen stylus with respect to the touchscreen; a body, including: a control unit computing module to combine the force signal and the tilt signal to generate a combined signal; and a communications module to transmit the combined signal.

These and other embodiments may each optionally include one or more of the following features. For instance, the tip is a conductive tip. The communications module includes one of a Wi-Fi communications module and a Bluetooth communications module. The tip is removable from the touchscreen stylus. The tilt sensing module includes an accelerometer. The force sensing module includes an electromagnet (EM) pressure sensing module, or an optical pressure sensing module.

Innovative aspects of the subject matter described in this specification may be embodied in a method including identifying, by a force sensing module of a touchscreen stylus, a force signal of a touchscreen stylus with respect to a touchscreen; identifying, by a tilt sensing module of a touchscreen stylus, a tilt signal of the touchscreen stylus with respect to the touchscreen; combining, by a control unit computing module, the force signal and the tilt signal to generate a combined analog signal; and communicating, by a communications module of the touchscreen stylus, the combined signal.

These and other embodiments may each optionally include one or more of the following features. For instance, identifying, by a position sensing module of a display module, a position signal of the tip of the touchscreen stylus in a x- and a y-plane of the touchscreen; and communicating, by a communications module of the display module, touch-position data representing the position signal. Receiving, by a communications module of a computing apparatus, the touchscreen stylus-based data and the touch-position based data; and performing, by a processing module of the computing apparatus, an inking function based on the combination of the touchscreen stylus-based data and the touch-position based data.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

This document describes a touchscreen stylus with a wireless data communication method (direct communication of stylus data to a system by wireless connection) that can be used by existing display modules with different touch technology (PCAP, IR, InGlass, EMR, etc.). This is done without any hardware modification to the display module. Further, the touchscreen stylus can be used across different existing devices such as portable computing devices with PCAP touch, meeting monitors with InGlass touch, and graphics tablets with EMR.

Specifically, this document describes a touchscreen stylus that interfaces with a display module that can be used across different touchscreen technologies. In short, the touchscreen stylus can obtain data regarding an interaction between the touchscreen stylus and the display module, and provide such data to a computing apparatus, independent of the display module. The data that the touchscreen stylus can obtain and provide to the computing apparatus can include data associated with a tilt of the touchscreen stylus with respect to the display module, and a pressure that the touchscreen stylus is exerting on the display module. The touchscreen stylus can process such data independent of the display module and any processing modules of the display module, and provide such processed data to the computing apparatus by a wireless connection.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Figure 1:
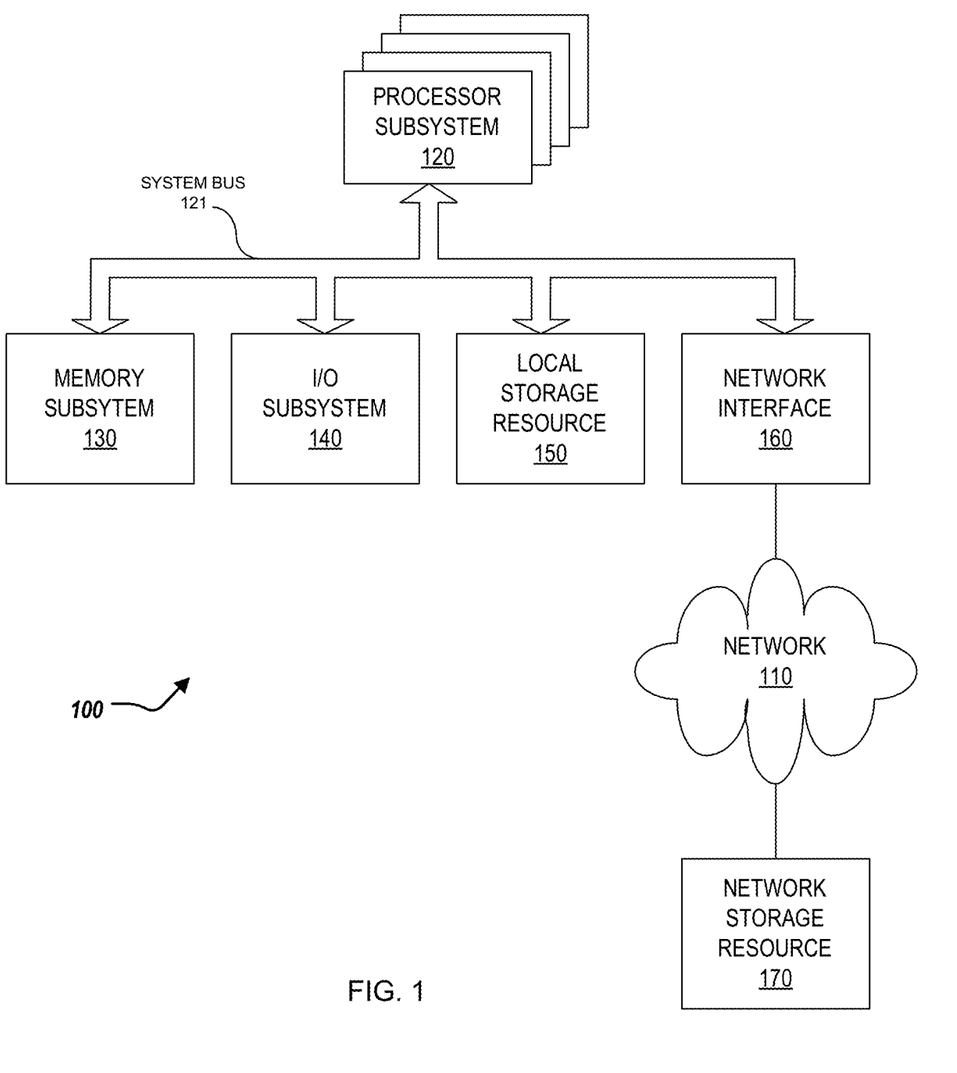
FIG. 1 is a block diagram of selected elements of an embodiment of an information handling system.
Figure 2:
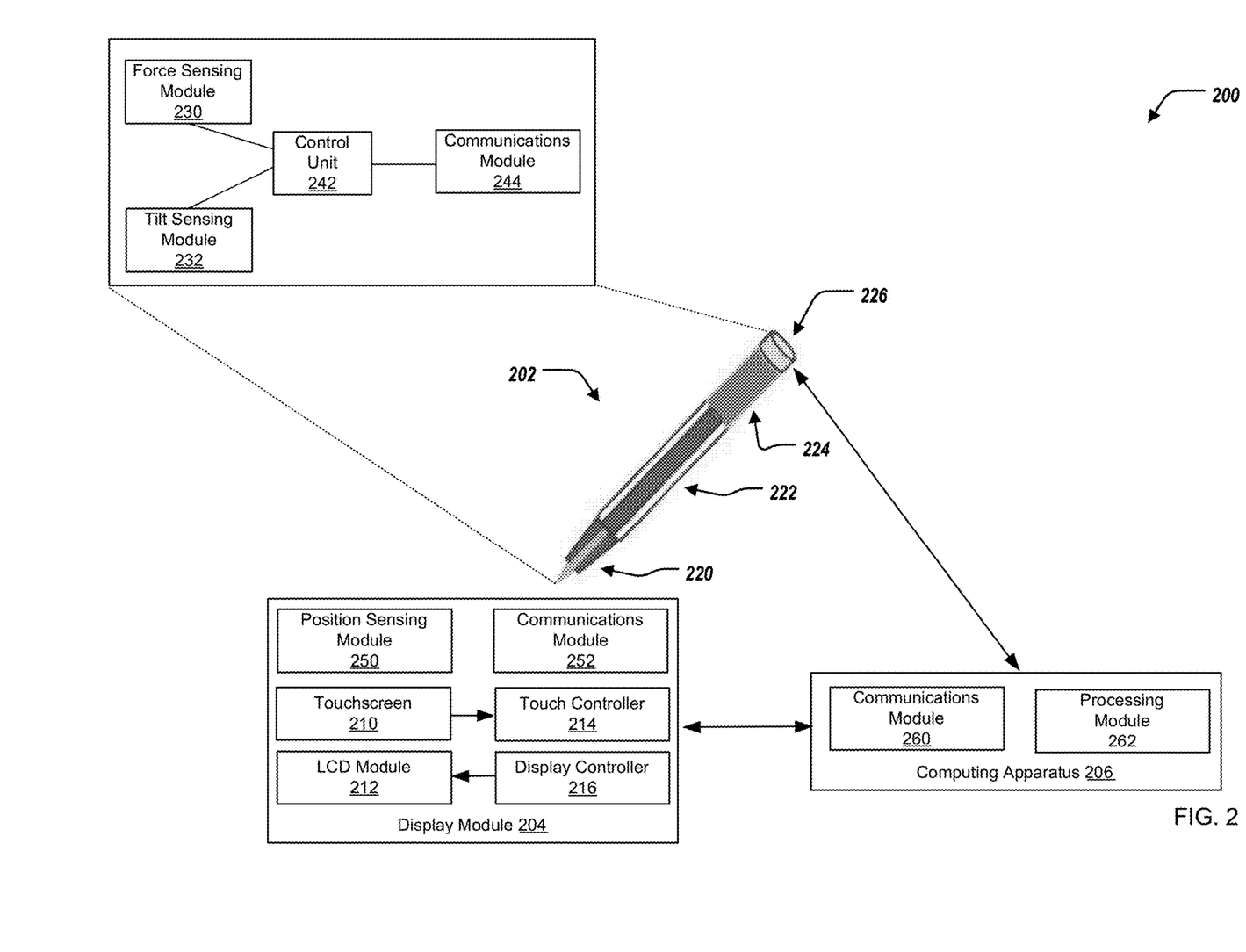
FIG. 2 illustrates a computing environment for a touchscreen stylus that interfaces with a display module.
Figure 3:
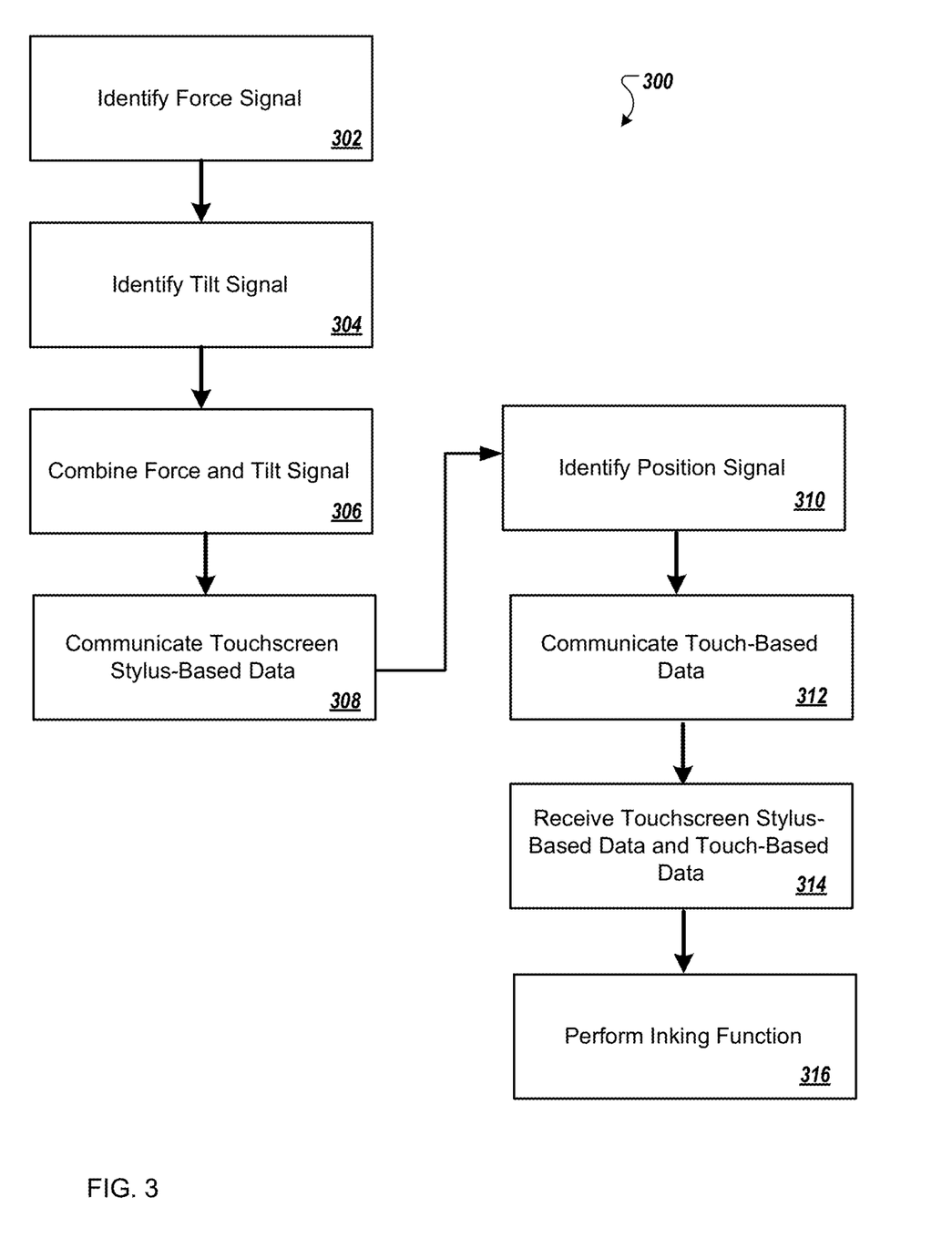
FIG. 3 illustrates a flowchart for interfacing between a touchscreen stylus and a display module.

Particular embodiments are best understood by reference to FIGS. 1-3 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Turning now to FIG. 2, FIG. 2 depicts a computing environment 200 for a touchscreen stylus that interfaces with a display module. The environment 200 can include a touchscreen stylus 202, a display module 204, and a computing apparatus 206. In some examples, the computing apparatus 206 can include the information handling system 100 of FIG. 1. In short, the touchscreen stylus 202 can obtain data regarding an interaction between the touchscreen stylus 202 and the display module 204, and provide such data to the computing apparatus 206, independent of the display module 204. The data that the touchscreen stylus 202 can obtain and provide to the computing apparatus 206 can include data associated with a tilt of the touchscreen stylus 202 with respect to the display module 204, and a pressure that the touchscreen stylus 202 exerts on the display module 204, described further herein. The touchscreen stylus 202 can process such data independent of the display module 204 and any processing modules of the display module 204, and provide such processed data to the computing apparatus 206 by a wireless connection, described further herein.

The display module 204 can include a touchscreen 210, a LCD module 212, a touch controller 214, and a display controller 216. In some examples, the display module 204 can be included by the I/O subsystem 140 of FIG. 1. In some examples, the touchscreen 210 can be referred to as a cover, cover glass, or a lens. In general, the display controller 216 provides signals to the LCD module 212 to control an operation thereof, including display of any interfaces provided by the LCD module 212. The touchscreen 210 can provide data to the touch controller 214 regarding a x-y position of the touchscreen stylus 202 with respect to the display module 202, and in particular, the touchscreen 210, described further herein.

The touchscreen stylus 202 can include a tip 220, a body 222, a battery portion 224, and a cap portion 226. The tip 220 can include a force (or pressure) sensing module 230 and a tilt sensing module 232. The force sensing module 230 can be configured to identify a force (or pressure) that is applied on the touchscreen 210 by the tip 220. In some examples, the force sensing module 230 can include an electromagnet (EM)-type pressure sensing module, or an optical pressure sensing module. To that end, the force sensing module 230 can identify the force that is applied on the touchscreen 210 by the tip 220 and generate a force signal corresponding to the force that is applied on the touchscreen 210 by the tip 220 (e.g., analog or digital signal). For example, the force sensing module 230 can determine the force that is applied on the touchscreen 210 by the tip 220 based on electromagnetic and/or optical measurements.

The tilt sensing module 232 can be configured to identify a tilt (or angle) of the touchscreen stylus 202, and in particular, the tip 220, with respect to the touchscreen 210. In some examples, the tilt sensing module 232 can include an accelerometer, and/or other positioning sensing modules (e.g., a gyroscope). To that end, the tilt sensing module 232 can identify the tilt (or angle) that is applied on the touchscreen 210 by the tip 220 and generate atilt signal corresponding to the tilt (or angle) that is applied on the touchscreen 210 by the tip 220 (e.g., analog or digital signal). For example, the tilt sensing module 232 can determine an acceleration and/or or orientation of the touchscreen stylus 202 with respect to the touchscreen 210 to determine the tilt (or angle) of the touchscreen stylus 202 with respect to the touchscreen 210.

In some examples, the tip 220 can be conductive. In some examples, the tip 220 is removable from the touchscreen stylus 202 (e.g. interchangeable). In some examples, the tip 220, or a portion of the tip 220, can be replaced with a differing tip (or portion of a tip), such as a different size (e.g., width) based on the display module 204, and in particular, based on a type of the touchscreen 210. In some examples, the tip 220 is compatible with different types of touchscreens 210, including a projected capacitive (PCAP) touchscreen, an InGlass touch technology touchscreen, an infrared (IR) touch technology touchscreen, and an electro-magnetic resonance (EMR) touch technology touchscreen.

The body 222 can include a control module 242, and a communications module 244. The control module 242 can receive the force signal and the tilt signal, and can process the force signal and the tilt signal, including packing and combining the force signal and the tilt signal. In some examples, the control module 242 can include an analog-to-digital converter (ADC), and/or a signal processor. The communications module 244 can receive the combined signal, and transmit the combined signal to the computing apparatus 206, e.g., utilizing an antenna that can be located in the cap portion 226. In other words, the communications module 244 can transmit touchscreen stylus-based data that represents the force and the tilt signal, e.g., to the computing apparatus 206. In some examples, the communications module 244 can be any type of wireless communications module, include a Wi-Fi communications module and a Bluetooth communications module. The battery 224 can provide a power source to any of the components of the touchscreen stylus 202.

The display module 204 can further include a position sensing module 250 and a communications module 252. The position sensing module 250 can be configured to identify a position of the touchscreen stylus 202, and in particular, the tip 220, in a x- and a y-plane of the touchscreen 210, e.g., with respect to a reference point of the touchscreen 210. The position sensing module 250 can identify the position of the tip 220 in the x-y plane of the touchscreen 210 and generate a position signal corresponding to the position of the tip 220 in the x-y plane of the touchscreen 210. In some examples, the touchscreen 210 is a PCAP touchscreen such that detection of the position of the tip 220 with respect to the touchscreen 210 is facilitated when the tip 220 is conductive. The communications module 252 can receive the position signal from the position sensing module 250, and transmit the position signal to the computing apparatus 206. In other words, the communications module 250 can transmit touch-position based data that represents the position signal, e.g., to the computing apparatus 206. In some examples, the position sensing module 250 provides the touch-position based data to the computing apparatus 206 by a system bus, e.g., the system bus 121 of FIG. 1.

The computing apparatus 206 can include a communications module 260 and a processing module 262. In some examples, the computing apparatus 206 can include the display module 204. The communications module 260 is configured to receive the touchscreen stylus-based data from the touchscreen stylus 202, and receive the touch-position based data from the display module 204. In some examples, the communications module 260 can be any type of wireless communications module, include a Wi-Fi communications module and a Bluetooth communications module. The processing module 262 can be configured to perform an inking function based on a combination of the touchscreen stylus-based data and the touch-position based data. Specifically, the processing module 262 can provide a signal to the display controller 216 such that the display controller 216 can adjust the presentation of the LCD module 212 based on the combination of the touchscreen stylus-based data and the touch-position based data. The signal provided by the processing module 262 to the display controller 216 can include a signal to adjust the display provided by the LCD module 212 to include representation of "ink" that is provided by the touchscreen stylus 202.

FIG. 3 illustrates a flowchart depicting selected elements of an embodiment of a method 300 for a touchscreen stylus that interfaces with a display module. The method 300 may be performed by the information handling system 100 and/or the computing environment 200 described herein with reference to FIGS. 1 and 2, or another information handling system. It is noted that certain operations described in method 300 may be optional or may be rearranged in different embodiments.

At 302, the force sensing module 230 of the touchscreen stylus 202 identifies a force signal of the touchscreen stylus 202 with respect to the touchscreen 210. At 304, the tilt sensing module 232 of the touchscreen stylus 202 identifies a tilt signal of the touchscreen stylus 202 with respect to the touchscreen 210. At 306, the control unit 242 of the touchscreen stylus 202 processes and combines the tilt signal and the force signal. At 308, the communications module 244 of the touchscreen stylus 202 communicates touchscreen stylus-based data including the combined signal to the computing apparatus 206. At 310, the position sensing module 250 of the display module 204 identifies a position signal of the tip 220 of the touchscreen stylus 202 in a x- and a y-plane of the touchscreen 210. At 312, the communications module 252 of the display module 204 communicates touch-based data representing the position signal to the computing apparatus 206. At 314, the communications module 260 of the computing apparatus 206 receives the touchscreen stylus-based data and the touch-position based data. At 316, the processing module 262 performs an inking function based on the combination of the touchscreen stylus-based data and the touch-position based data.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both,"

unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computing environment, comprising;
   a touchscreen stylus, including:
      a first and a second tip, the first and second tips each including:
         i) a force sensing module configured to generate a force signal indicating a pressure that the touchscreen stylus exerts on a touchscreen,
         ii) a tilt sensing module configured to:
            determine an acceleration of the touchscreen stylus with respect to the touchscreen;
            determine an orientation of the touchscreen stylus with respect to the touchscreen;
            determine a tilt of the touchscreen stylus based on i) the acceleration of the touchscreen stylus with respect to the touchscreen and ii) the orientation of the touchscreen stylus with respect to the touchscreen;
            generate a tilt signal indicating the tilt of the touchscreen stylus with respect to the touchscreen; and
      a body, including:
         i) a control module to process the force signal and the tilt signal, including packing and combining the tilt signal and the force signal into a combined signal of touchscreen-stylus based data; and
         ii) a communications module configured to transmit touchscreen stylus-based data representing the force signal and the tilt signal,
         wherein each of the first and the second tips are removably coupled to the body of the touchscreen stylus such that one of the first tip and the second tip is coupled to the body of the touchscreen stylus at a time based on a type of the touchscreen;
   a display module, including:
      i) the touchscreen;
      ii) a position sensing module configured to generate a position signal indicating a position of the tip of the touchscreen stylus in a x- and a y-plane of the touchscreen;
      iii) a communications module configured to transmit touch-position based data representing the position signal;
   a computing apparatus, including:
      i) a communications module configured to receive the touchscreen stylus-based data and the touch-position based data; and
      ii) a processing module configured to perform an inking function based on a combination of the touchscreen stylus-based data and the touch-position based data,
   wherein the touchscreen stylus generates the force signal and the tilt signal independent of the display module generating the position signal, and
   wherein the touchscreen stylus processes the force signal and the tilt signal to generate the combined signal independent of processing by the computing apparatus.

2. The computing environment of claim 1, wherein the first tip is a conductive tip, and the touchscreen is a projected capacitive (PCAP) touchscreen.

3. The computing environment of claim 1, wherein the communications module of the touchscreen stylus includes one of a Wi-Fi communications module and a Bluetooth communications module.

4. The computing environment of claim 1, wherein the tilt sensing module includes an accelerometer.

5. The computing environment of claim 1, wherein the force sensing module of the first tip includes an electromagnet (EM) pressure sensing module, and the force sensing module of the second tip includes an optical pressure sensing module.

6. The computing environment of claim 1, wherein the display module is coupled to the computing apparatus.

7. The computing environment of claim 1, wherein the force signal is an analog force signal, and the tilt signal is an analog tilt signal.

8. A touchscreen stylus, comprising:
   a first and a second tip, the first and second tips each including:
      i) a force sensing module to generate a force signal of the touchscreen stylus with respect to a touchscreen;
      ii) a tilt sensing module to:
         determine an acceleration of the touchscreen stylus with respect to the touchscreen;
         determine an orientation of the touchscreen stylus with respect to the touchscreen;
         determine a tilt of the touchscreen stylus based on i) the acceleration of the touchscreen stylus with respect to the touchscreen and ii) the orientation of the touchscreen stylus with respect to the touchscreen;
      generate a tilt signal indicating the tilt of the touchscreen stylus with respect to the touchscreen;
   a body, including:
      i) a control unit computing module to process the tilt signal and the force signal, including packing and combining the force signal and the tilt signal into a combined signal of touchscreen-stylus based data; and
      ii) a communications module to transmit the combined digital signal, wherein each of the first and the second tips are removably coupled to the body of the touchscreen stylus such that one of the first tip and the second tip is coupled to the body of the touchscreen stylus at a time based on a type of the touchscreen wherein the touchscreen stylus generates the force signal and the tilt signal independent of a display module that generates a positional signal indicating a position of the tip in a x-y plane of a touchscreen of the display module, and wherein the touchscreen stylus processes the force signal and the tilt signal to generate the combined signal independent of processing by a computing apparatus that performs an inking function based on the combined signal and the positional signal.

9. The touchscreen stylus of claim 8, wherein the first tip is a conductive tip.

10. The touchscreen stylus of claim 8, wherein the communications module includes one of a Wi-Fi communications module and a Bluetooth communications module.

11. The touchscreen stylus of claim 8, wherein the tilt sensing module includes an accelerometer.

12. The touchscreen stylus of claim 8, wherein the force sensing module of the first tip includes an electromagnet (EM) pressure sensing module, and the force sensing module of the second tip includes an optical pressure sensing module.

13. A computer-implemented method, comprising:
coupling one of a first tip and a second tip of a touchscreen stylus to a body of the touchscreen stylus based on a type of a touchscreen, the first and the second tips are removably coupled to the body of the touchscreen stylus;

generating, by a force sensing module of a touchscreen stylus, a force signal of a touchscreen stylus with respect to a touchscreen;

determining, by a tilt sensing module of the touchscreen stylus, an acceleration of the touchscreen stylus with respect to the touchscreen;

determining, by the tilt sensing module of the touchscreen stylus, an orientation of the touchscreen stylus with respect to the touchscreen;

determining, by the tilt sensing module of the touchscreen stylus, a tilt of the touchscreen stylus based on i) the acceleration of the touchscreen stylus with respect to the touchscreen and ii) the orientation of the touchscreen stylus with respect to the touchscreen; and generating, by the tilt sensing module of the touchscreen stylus, a tilt signal indicating the tilt of the touchscreen stylus with respect to the touchscreen;

processing, by a control unit computing module, the force signal and the tilt signal, including packing and combing the tilt signal and the force signal into a combined signal of touchscreen-stylus based data;

communicating, by a communications module of the touchscreen stylus, the touchscreen stylus-based data representing the combined signal;

generating, by a position sensing module of a display module, a position signal indicating a position of the tip of the touchscreen stylus in a X- and a y-plane of the touchscreen;

communicating, by a communications module of the display module, touch-position based data representing the position signal;

performing, by a processing module of a computing apparatus, an inking function based on a combination of the touchscreen stylus-based data and the touch-position based data, wherein the touchscreen stylus generates the force signal and the tilt signal independent of the display module generating the position signal, and wherein the touchscreen stylus processes the force signal and the tilt signal to generate the combined signal independent of processing by the computing apparatus, wherein the first and the second tips each include the force sensing module and the tilt sensing module.

* * * * *